3,352,902
SULFOMETHYLATION OF HUMIC ACIDS, LIGNITES, AND COALS AND PRODUCTS THEREOF
Spiros E. Moschopedis, Edmonton, Alberta, Canada, assignor to Canadian Patents and Development Limited, National Research Council, Ottawa, Ontario, Canada
No Drawing. Filed Jan. 13, 1964, Ser. No. 337,169
9 Claims. (Cl. 260—507)

This invention relates to the solubilization of water-insoluble humic acids and certain coals or water-insoluble coal derivatives by sulfomethylation. Peripheral H atoms are replaced by sulfomethyl radicals $$-CH_2.SO_3.M-$$

where M is a monovalent cation such as hydrogen alkali metal or ammonium.

Humic acids are complex materials that may be obtained from coal by mild oxidation (e.g. in air or by certain liquid phase oxidants) and subsequent extraction of the oxidized mass with aqueous alkalis, or by direct alkali extraction of in situ weathered coal. They may be recovered from the resultant alkali solution by precipitation with a slight excess of acid. Humic acids are dark brown to black water-insoluble solids of uncertain chemical structure.

Various lignites and sub-bituminous low rank coals are also amendable to treatment according to the invention to give water-soluble products.

Previously humic acids and coals have been directly sulfonated, i.e. treated with sulfuric acid to introduce sulfonic acid or sulfonate groups, but these sulfonated products were not water-soluble and could not be dissolved, purified and otherwise treated as an organic chemical. They have usually found applications as ion exchange materials.

Water-soluble acids have previously been obtained by severe oxidation treatments of humic acids and some coals, but far-reaching molecular breakdown has always accompanied the oxidation, and the water-soluble products were therefore extensively degraded materials.

An object of the invention is to solubilize humic acids and coals without significant molecular degradation. A further object is to introduce sulfomethyl groups into the humic acid molecule. Another object is to introduce halogen atoms into the sulfomethylated product.

According to the present invention, humic acids, lignites or pre-oxidized sub-bituminous coals are sulfomethylated by treatment with an aqueous solution of formaldehyde and sodium (or other alkali) bisulfite. Alternatively, the humic acids or coals are stirred into an aqueous solution of ammonia, and formaldehyde and sulfur dioxide added to the resultant solution or suspension. The reaction temperature is conveniently about 100° C. An excess of formaldehyde and bisulfite is usually added to give as complete sulfomethylation as possible. The reaction is usually substantially complete within about one hour at 100° C. The sulfomethylated reaction products are water-soluble or in the case of some coals form stable colloidal sols. In the case of humic acids the entire product is completely water-soluble at pH values greater than about 2–3. With lignites and pre-oxidized low rank coals (e.g. sub-bituminous coals first subjected to mild oxidation) sulfomethylation yields as much as 50–60% water-solubles similar to the humic acid products. Pre-oxidation, where necessary, may be effected by any of the several conventional methods used for oxidizing coal and coal-like solids.

It is usually desirable to purify the water-soluble products to remove inorganic residues and insoluble materials. This may be done by washing with 10% (or more concentrated) mineral acid, electrodialyzing in water or passing through an ion exchange resin. Other purification techniques are also possible. Purification is important for many applications as it results in virtually complete demineralization and removal of insolubles. Demineralization of the initial sulfomethylated product with 10% HCl has been found to lower the mineral content to less than 0.1%, and often to less than 0.05%.

Further according to the invention the water-soluble products can be directly halogenated e.g. by reaction in a homogeneous aqueous solution with chlorine or bromine to incorporate up to about 25% by wt. halogen. This introduction of halogen into the molecule appears to involve mainly an addition reaction and concurrent oxidation is slight. It has also been found that unless the treatment with halogen is continued for many hours the molecular degradation (by oxidation) is negligible. Various conditions and reactants can be used for the halogenation. Chlorination has been rapidly effected by saturating a dilute aqueous solution of the sulfomethylated product with $CCl_4$ and exposing to an ultrasonic field which forms nascent chlorine in situ. However, simply bubbling the halogen gas through an aqueous solution at room temperature is also quite effective.

The water-soluble sulfomethylated products are useful as tanning agents, additives to control the flow properties of drilling muds, cements or paints, fertilizer components (e.g. when $M \cong NH_4$), and as intermediates in the production of high purity electrode carbons and graphites from coal. The halogenated sulfomethylated products are useful as inexpensive biocidal agents, and as flame retardant additives to materials such as roofing asphalts and paints.

The following examples will serve to illustrate the invention.

*Example 1*

Three grams of humic acids obtained from an Alberta in situ weathered (i.e. in situ oxidized) sub-bituminous coal were dissolved in 50 ml. of dilute (5%) aqueous sodium hydroxide, and the solution added to 40 ml. of freshly prepared 0.05 M sodium hydroxymethane sulfonate solution. The resulting mixture was then refluxed for about one hour at about 100° C., cooled and centrifuged to remove traces of insolubles. The soluble product was isolated by precipitating with concentrated hydrochloric acid and centrifuging. Purification was carried out by washing the resultant solid with 10% HCl (which avoids peptization), centrifuging and electrodialyzing in aqueous solution. Alternatively to electrodialyzing, the sulfomethylated product has been satisfactorily purified by neutralizing and dissolving the product obtained after washing with 10% HCl, and passing through a cation exchange resin.

The yield of water-soluble sulfomethylated product corresponded to almost 100% conversion of the original humic acids, and mineral contents were less than 0.04%.

*Example 2*

Ten grams of a lignite from the Bienfait region of Saskatchewan, Canada were ground to −50 mesh and suspended in 150 ml. of dilute (5%) aqueous sodium hydroxide solution. This alkaline solution was then treated with freshly prepared sodium hydroxymethane sulfonate solution as in Example 1, the insoluble matter removed and again treated like the original lignite. After four successive treatments, a total of about 50% by wt. of the original lignite was obtained in water-soluble form.

*Example 3*

160 grams of in situ weathered sub-bituminous coal from the Sheerness region of Alberta, Canada were ground to −150 mesh and suspended in a mixture containing 1500 ml. water and 100 ml. concentrated ammonium hydroxide. 7.2 ml. of a 37% aqueous formaldehyde solution were then added to the suspension, sulfur dioxide passed through it until the pH was in the range 7.5–8.5, and the mixture refluxed for 1 hour at about 100° C. After cooling, the mixture was centrifuged to remove insoluble matter. A yield of about 70 grams of water-soluble matter was obtained. This water-soluble product was precipitated with 10% aqueous hydrochloric acid, washed, electrodialyzed and finally repeatedly (three times) treated with fresh aliquots of a 1:1 hydrochloric acid/water mixture at 60° C. Mineral matter contents of the resultant product were less than 0.1%.

*Example 4*

The sulfomethylated products of Examples 1, 2 and 3 were chlorinated as follows. Two gram quantities of the products were dissolved in 2000 ml. of water and gaseous chlorine bubbled through the solutions for 20 minutes at a rate of about 50 cc. per min. The color of the solutions changed progressively from brown to pale yellow during this treatment. The products were then recovered by evaporation to dryness on a steam bath and on analysis were found to contain 22% by wt. bound chlorine. Electrodialysis of the chlorinated products in aqueous media showed that little molecular degradation had occurred during chlorination.

Bromination was carried out in a similar manner with similar results.

I claim:

1. A process for solubilizing humic acids, lignites and pre-oxidized sub-bituminous coals comprising reacting said materials in alkali solution with alkali hydroxymethane sulfonate at elevated temperatures of the order of 100° C. until sulfomethylation is substantially complete, separating the insoluble matter, precipitating the soluble sulfomethylated product with concentrated acid, washing the precipitate with mineral acid solution of concentration at least about 10% to remove mineral matter, and recovering the water-soluble product.

2. The process of claim 1 wherein the soluble sulfomethylated product is reacted in aqueous solution with halogen until up to about 25% by wt. halogen is bound to the molecule the halogen being chlorine or bromine.

3. The process of claim 1 wherein the reaction with alkali hydroxymethane sulfonate solution is carried out for about one hour at about 100° C., and the insoluble matter separated.

4. The process, of claim 2 wherein chlorine gas is passed through the solution until from 20 to 25% by wt. chlorine is bound.

5. A water-soluble derivative of humic acids containing —$CH_2.SO_3.NH_4$ groups and substantially free of mineral matter and produced by reaction in alkali solution with alkali hydroxymethane sulfonate at temperatures of the order of 100° C. without degradation beyond the humic acid stage.

6. A water-soluble demineralized derivative of lignites and pre-oxidized sub-bituminous coals containing

—$CH_2.SO_3.NH_4$ groups and produced by reaction in alkali solution with alkali hydroxymethane sulfonate at temperatures of the order of 100° C. without degradation beyond the humic acid stage.

7. The humic acid derivative of claim 5 including chemically bound halogen selected from chlorine and bromine.

8. The lignite and coal derivative of claim 6 including chemically bound halogen selected from chlorine and bromine.

9. A water-soluble demineralized derivative of humic acids, lignites and pre-oxidized sub-bituminous coals, containing —$CH_2.SO_3.M$ radicals where M is a cation from the group hydrogen, alkali metal and ammonium, and halogen radicals from the groups chlorine and bromine in amounts of about 20 to 25% by wt. and produced by reaction in alkali solution with alkali hydroxymethane sulfonate at temperatures of the order of 100° C. without degradation beyond the humic acid stage.

References Cited

UNITED STATES PATENTS

| | | | |
|---|---|---|---|
| 2,872,278 | 2/1959 | Putnam et al. | 260—413.5 |
| 3,034,982 | 5/1962 | Monroe | 260—125 |
| 3,173,946 | 3/1965 | Battazzi et al. | 260—515 |

OTHER REFERENCES

Franke et al.: Ind. Eng. Chem., vol. 44, No. 11 (Nov. 1952), pp. 2784–2792.

Slather et al.: Gesammelte Abhandl, Ceul. Lederinsts Freiburg-Sa. No. 12, 69–82 (1955) CA relied on. vol. 50, columns 1345–6 (1956).

LORRAINE A. WEINBERGER, *Primary Examiner.*

M. WEBSTER, *Assistant Examiner.*